United States Patent [19]

Secchiaroli et al.

[11] Patent Number: 4,932,609
[45] Date of Patent: Jun. 12, 1990

[54] FUEL TRANSFER SYSTEM FOR AIRCRAFT

[75] Inventors: Lawrence N. Secchiaroli, Stratford; Raymond C. Cresiski, Jr., Milford; Thomas P. Wilson, Trumbull, all of Conn.

[73] Assignee: United Technologies Corporation, Hartford, Conn.

[21] Appl. No.: 316,264

[22] Filed: Feb. 27, 1989

[51] Int. Cl.⁵ .............................................. B64D 37/00
[52] U.S. Cl. ............................ 244/135 C; 244/135 R; 137/571; 137/256
[58] Field of Search ..................... 137/572, 571, 256; 244/135 R, 135 C

[56] References Cited

U.S. PATENT DOCUMENTS

| | | | |
|---|---|---|---|
| 2,516,150 | 7/1950 | Samiran | 244/135 C |
| 2,557,438 | 6/1951 | Johnson | 137/256 |
| 3,259,066 | 7/1966 | Williams et al. | 137/571 |
| 3,279,522 | 10/1966 | Norris et al. | 244/135 R |
| 3,383,078 | 5/1968 | Shohet et al. | 244/135 R |

Primary Examiner—Joseph F. Peters, Jr.
Assistant Examiner—Anne Sartelle
Attorney, Agent, or Firm—Edward L. Kochey, Jr.

[57] ABSTRACT

Parallel transfer pumps (92, 94) operate to transfer fuel from auxiliary tanks (52, 60, 66) to the main tank (10). A pressure sensor (106) in the pump discharge line in combination with tank level rate mechanisms (86, 88, 90) sequences pumps (92, 92) and transfer valves (100, 102) if required, and confirms successful transfer or alarms when unsuccessful.

15 Claims, 2 Drawing Sheets

FUEL TRANSFER SYSTEM FOR AIRCRAFT

The Government has rights in this invention pursuant to a contract awarded by the Department of the Navy.

TECHNICAL FIELD

This invention relates to transfer of fuel between tanks of an aircraft and in particular to automatic management of a system for transferring fuel from auxiliary tanks to the main tank.

BACKGROUND OF THE INVENTION

An aircraft such as a helicopter will normally have a main fuel tank and one or more inboard auxiliary tanks. It may also carry several outboard auxiliary tanks. For safety reasons it is desirable to be able to fuel the aircraft filling all tanks with no electrical power applied. Fuel is supplied under pressure to an inlet point for distribution to the various tanks.

Automatic hover in flight refueling is also desirable which permits controlled center-of-gravity refueling of the helicopter in flight.

As fuel in the main tank is used there comes a point where it is necessary to transfer fuel to the main tank from the auxiliary tanks. It is much preferred that this be automatic, either in response to a low level in the tank or in response to a pilot initiated actuating signal. Conveniently, flow transfer should operate without pilot intervention, but it is important that the pilot be alerted to any failure of the system.

Reliability and light weight of the system is important with penalties in the order of $250 a pound being charged for weight. Prior art refueling schemes required multiple flapper type valves and flow rate sensors which involved moving parts subject to wear and significant weight.

Fuel level, flow rate and pressure measurement traditionally relied on mechanical devices using moving parts which wear, break down, occupy large spaces, add substantial weight and incur maintenance costs with low reliability and accuracy.

SUMMARY OF THE INVENTION

A fuel management system has a main tank and a plurality of auxiliary tanks. The main tank pipe from inside the main tank passes through a normally open valve and is in fluid communication with each auxiliary tank through a corresponding auxiliary tank normally-open valve. A plurality of transfer pumps in parallel flow relationship are in series with a plurality of transfer valves in parallel flow relationship. The pump takes suction from the line between the main tank shutoff valve and the auxiliary tanks and discharges through the transfer valves to the main tank.

A pressure sensor downstream of the transfer valves senses pressure above a preselected level when fluid is being pumped by one of the pumps and passing through at least one of the transfer valves. This provides an enabling signal permitting this system to respond to the change in fuel level. A time difference sample of level is taken in the main fuel tank to confirm that level is increasing at an adequate rate for the expected flow and also level samples over the time period are taken from the auxiliary tank confirming that the respective auxiliary tank is decreasing in level at an appropriate rate. When operation is satisfactory the transfer continues to completion.

In the absence of confirmation of fuel transfer in the first instance the transfer valves are switched, and if flow still is not occurring the pumps are switched. The pilot is alerted with confirmation of flow if it occurs or a no-flow alarm if it does not occur. He may then take whatever manual operating steps available to manually effect the transfer.

DESCRIPTION OF THE PREFERRED EMBODIMENT

Figure 1:
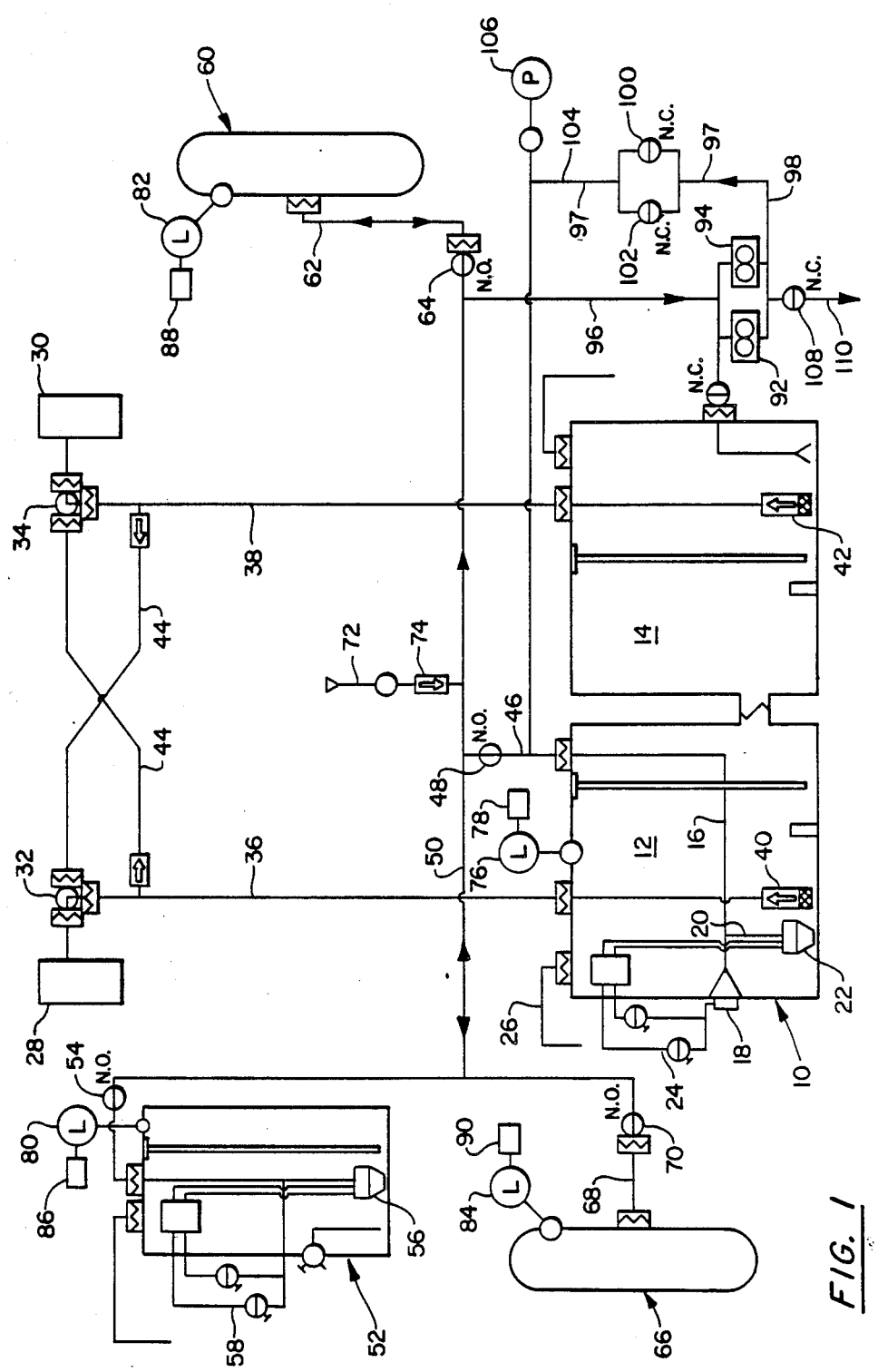
FIG. 1 is a schematic of the fuel management system.

Main fuel tank 10 may be divided into a first section 12 and a second section 14 and includes an internal main tank pipe 16. Inlet nozzle 18 is connected thereto passing fuel during pressure refueling through pipe 20 and this flow is controlled by level controller 24 which closes valve 22 when the fuel in the main tank reaches a preselected level below that which would cause it to flow through overflow pipe 26.

Engines 28 and 30 draw fuel through valves 32 and 34 and engine supply lines 36 and 38 which have check valves 40 and 42 at the inlet. Crossover lines 44 may be provided.

A portion 46 of the internal main tank pipe 16 extends to the exterior of the tank with main tank shutoff valve 48 connected to the end. This valve is normally open so that under pressure refueling the fuel will pass therethrough. An auxiliary tank pipe is connected between the plurality of auxiliary tanks and the second side of the main tank shutoff valve. This is connected to internal auxiliary tank 52 through normally open auxiliary tank valve 54. It passes through another fuel/defuel valve 56 which is controlled by level control 58 to limit the level in this tank.

The auxiliary tank pipe 50 is also connected through line 62 to righthand auxiliary tank 60. Flow passes to this tank through normally open auxiliary tank valve 64.

Lefthand auxiliary tank 66 is also connected to auxiliary tank pipe 50 with lines 68 and normally open valve 70.

During pressure refueling operation fuel is introduced through nozzle 18 filling the auxiliary tanks 60 and 66 and filling main tank 10 and auxiliary tank 52 until the level control shuts off flow to these tanks. With the above-described valves in normally open position, such refueling can be carried out without any applied electrical power.

With aircraft power applied, all auxiliary tank valves 54, 64, 70 are initially energized closed. The controls sequence the order in which the tanks are filled, by de-energizing to open each appropriate valve. For hover in flight refueling an inlet nozzle 72 is connected through check valve 74 to auxiliary tank pipe 50. It can be seen that similar (power applied) refueling of all tanks can be carried out.

In hover in flight refueling there already is power on board and accordingly the various normally open valves are operated to appropriately sequence the filling of the various tanks in a desired order. It is of course also possible to do this during the normal pressure refueling if desired.

The main tank 10 has a level sensor 76 in the form of a capacitance probe which has attached thereto a level sampling apparatus 78. Similar level sensors 80,82 and 84 with level rate means 86,88 and 90 are installed in auxiliary tanks 52,60 and 66, respectively.

The first centrifugal pump 92 and a second centrifugal pump 94 are located in parallel flow relationship with pump suction line 96 being connected to the auxiliary flow pipe 50.

Pump discharge pipe 97 has a first portion 98 upstream of transfer valves 100 and 102, and a second portion 104 downstream of the transfer valves. These transfer valves are located in parallel flow relationship.

Pressure sensor 106 is located to sense pressure in portion 104 of pump discharge line 97, this being downstream of both the pumps and the transfer valves.

During transfer operation of fuel from an auxiliary tank to the main tank the auxiliary tank valve in question, for instance 54, is left open with the other auxiliary tank valves, for instance 70 and 64 closed. Normally open main tank shutoff valve 48 is closed. With one of the pumps such as 92 operating and one of the transfer valves such as 100 open fuel is drawn through valve 54, line 50 and suction line 96 being transferred into line 104 to line 46 and then into the main fuel tank 10. The design rate of flow through the line 104 creates a back pressure in line 104 with this pressure being sensed by pressure sensor 106. The sensed pressure is compared to a preselected level which is sufficient to indicate the passage of predicted flow but is sufficiently low to not be deceived by the static head of fuel in the line. Accordingly the presence of the sensed pressure level is strongly suggestive that pump 92 is properly operating and that valve 100 is open. Since there may be air in the lines which needs to be pumped out before the appropriate flow rate is achieved a reasonable time delay is required before the control system reaches a conclusion that there is no fluid being pumped.

If after a preselected time pressure does not exist the automatic system changes the transfer valves in the event that the one initially opened had failed and again looks for pressure. If after this preselected time pressure does not exist, then pump 92 is shut down and pump 94 started. If no pressure still exists this is indicative of a failure of the transfer operation.

If the pressure is sensed however it is not conclusive that there is flow passing into the main tank, since it is possible that the line is plugged.

Accordingly level of the main tank sensed by sensor 76 is compared in level rate logic 78 by sampling the level at two discrete time intervals and comparing the two. If this comparison indicates an increasing level of predicted magnitude within the main tank then flow transfer is confirmed. If it does not find a sufficient increase in level then the failure of transfer is indicated.

As further confirmation the level detected by sensor 80 in auxiliary tank 52 is time sampled through level rate means 86 and should be indicative of a decreasing level within the tank of at least a preselected rate.

A dump valve 108 is connected to pipe 98 between the discharge of the pumps and the transfer valves. This valve is normally closed and when open has discharge 110 to atmosphere. For an emergency fuel dump the transfer valves 100 and 102 are closed with one or both pumps 92 and 94 operated so that fuel may be expeditiously pumped overboard.

Figure 2:
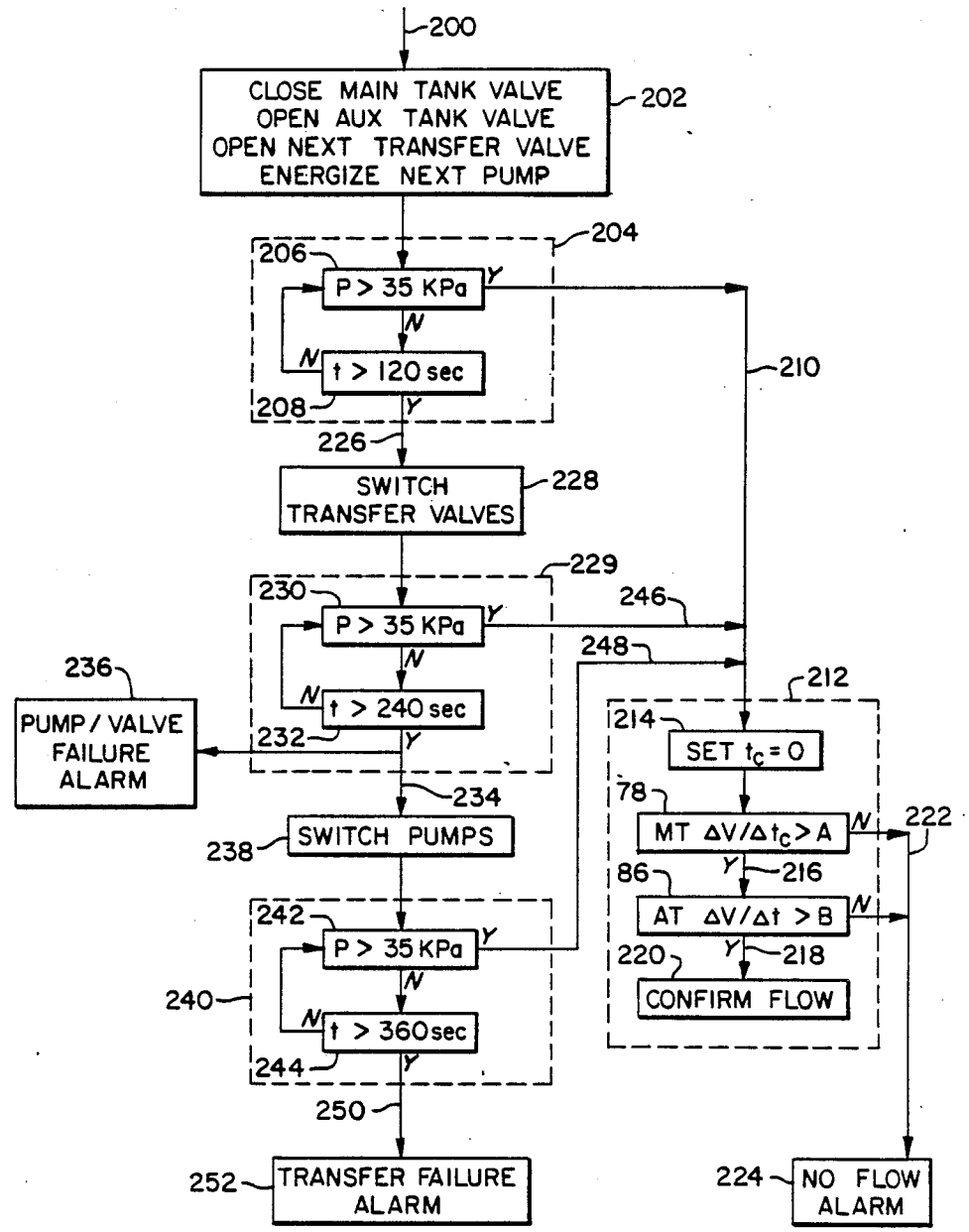
FIG. 2 is a logic diagram of the operation of the transfer valves and pumps and the resulting alarms.

Referring to FIG. 2, an initiate transfer signal 200 is passed to logic box 202. This initiating signal may function automatically from a low main tank level or may be a signal initiated manually by the pilot.

On the initiation of transfer the logic box 202 closes the main tank valve 48 and opens the auxiliary tank valve, such as 54. It opens a transfer valve 100 or 102, the valve being that opposite the last open valve. It also energizes one of pumps 92 or 94, the pump being selected being the pump which has not operated the last time.

With this complete signal passes to valve timer logic means 204 where logic box 206 asks whether the pressure sensed by pressure sensor 106 is greater than 35 kilopascals. If it is not, a signal passes to logic box 208 which delays action for 120 seconds returning the query to the logic box 206. If pressure at the appropriate level is sensed within 120 seconds, the signal passes through line 210 transferring action to the capacitance level sensors of the tanks to determine flow. Having established the existence of pressure in the discharge line confirmation of level change is now desirable. Accordingly, within confirmation logic 212, logic box 214 starts the timer with level rate detecting means 78 sampling the level or volume within the main tank at two discrete time intervals. If this exceeds the minimum predicted value, the signal passes through line 216 to rate determining means 86 which checks to see that the level in the auxiliary tank 52 is falling at the appropriate rate. If so, a signal passes through line 218 to confirm flow logic 220 which advises the pilot that fuel transfer is occurring.

If either level rate means 78 or 76 finds that fuel is not transferring at the appropriate rate, the signal passes through line 222 to a no flow alarm 224 which advises the pilot that flow is not occurring.

Returning now to valve timer logic means 204, assuming that the pressure does not exceed 35 kilopascals in 120 seconds, a signal passes through line 226 to valve switch logic means 228 which closes the transfer valve 100 and 102 which was intended to be opened and opens the other valve. Within first pump timer logic 229, pressure sensor logic 230 again looks for a pressure exceeding 35 kilopascals until time exceeds 240 seconds as indicted by timer logic 232.

If pressure does not exist after that time period, a signal through line 234 passes to a pump valve failure alarm 236 which alerts the pilot of the potential failure. This signal also passes to switch pump logic 238 which closes down a now operating pump and starts the other. A second pump timer logic 240 again through pressure logic box 242 looks for 35 kilopascals within a time of 360 seconds set by time logic box 244. Should pressure be found to exist in either of these last two timers, a signal indicative of the successful pressure passes through lines 246 or 248 into line 210 continuing the previously described logic within confirmation logic 212.

In the event that pressure is still not detected after 360 seconds, a signal passes through line 250 to a transfer failure alarm 252 alerting the pilot to the failure of transfer.

We claim:

1. An auxiliary fuel management system for an aircraft comprising:
   a main fuel tank;
   an internal main tank pipe terminating within said main tank and extending to the exterior of said main tank;
   an auxiliary tank;
   a plurality of transfer pumps in parallel flow relationship;

a main tank shutoff valve with a first side connected to the end of the exterior portion of said internal main tank pipe;

a pump discharge pipe connected between the discharge of said pumps and said internal main tank pipe;

an auxiliary tank pipe connected between said auxiliary and a second side of said main tank shutoff valve;

a pump suction pipe connected to said auxiliary flow pipe and the suction of said pumps;

a main tank level sensor;

a pressure sensor located in said pump discharge pipe;

main tank level rate means for determining the rate of change of main tank level in response to said main tank level sensor;

transfer initiation means operative in response to an initiating signal to close said main tank shutoff valve and to energize one of said pumps;

a first pump timer logic means responsive to said pressure for detecting pressure above a preselected level within a first preselected time, and for establishing a first pressure sensed signal or a first pressure not sensed signal;

pump switch logic means responsive to said first pressure not sensed signal for energizing another of said pumps;

second pump timer logic means responsive to said pressure sensor for detecting pressure above a preselected level within a second preselected time for establishing a second pressure sensed signal or a second pressure not sensed signal;

confirmation logic means responsive to said first or second pressure sensed signals and to said main tank level rate means for confirmation of the existence of flow when the main tank level is increasing at at least a preselected rate; and no flow alarm means responsive to said confirmation logic means for alarming in the absence of confirmation when the main tank level is not increasing at at least the preselected rate.

2. An auxiliary fuel management system as in claim 1 having also:

an auxiliary tank level sensor; and auxiliary tank level rate means for determining the rate of change of the auxiliary tank level in response to said auxiliary tank level sensor.

3. An auxiliary fuel management system as in claim 1 having also:

a plurality of transfer valves in parallel flow relationship located in said pump discharge pipe between said pumps and said pressure sensor;

said transfer initiating means also operative to open said one of said transfer valves;

valve timer logic means responsive to said pressure sensor for detecting pressure above a preselected level within a third preselected time greater than said second preselected time by a time which is less than said first preselected time, and for establishing a third pressure sensed or a third pressure not sensed signal;

valve switch logic means responsive to said third pressure not sensed signal for opening another of said transfer valves; and said confirmation logic means also responsive to said third pressure sensed signal.

4. An auxiliary fuel management system as in claim 1 wherein:

said pump switch logic means also responsive to said first pressure not sensed signal for de-energizing said one pump.

5. An auxiliary fuel management system as in claim 3 wherein:

said pump switch logic means also responsive to said first pressure not sensed signal for de-energizing said one pump.

6. An auxiliary fuel management system as in claim 5:

said valve switch logic means also responsive to said third pressure not sensed signal for closing said one transfer valve.

7. An auxiliary fuel management system as in claim 2:

said confirmation logic means also responsive to said auxiliary tank level rate means; and said no flow alarm means responsive to said confirmation logic means for alarming also in the absence of confirmation when said auxiliary tank level is not decreasing.

8. An auxiliary fuel management system as in claim 6 wherein:

said first preselected time is between 20 and 400 seconds;

said second preselected time is between 30 and 600 seconds; and said third preselected time is between 10 and 350 seconds greater than said second preselected time.

9. An auxiliary fuel management system as in claim 8 wherein:

the difference between said second preselected time and said first preselected time is substantially equal to said first preselected time.

10. An auxiliary fuel management system as in claim 1:

a transfer failure alarm; and said transfer failure alarm responsive to said confirmation logic in the absence of confirmation.

11. An auxiliary fuel management system as in claim 1:

said preselected pressure being greater than the potential static head of fuel standing in said fuel discharge line.

12. An auxiliary fuel management system as in claim 3:

a normally closed dump valve fluidly connected between said pump discharge and said transfer valves with a discharge end of said dump valve open to atmosphere.

13. An auxiliary fuel management system as in claim 2 wherein:

said auxiliary tank level sensor is a capacitance type level sensor.

14. An auxiliary fuel management system as in claim 1 wherein said main tank level sensor is a capacitance type level sensor.

15. An auxiliary fuel management system as in claim 1 wherein said main tank level rate means comprises:

means for determining a first level at a first time;

means for determining a discrete time difference;

means for determining a second level after said discrete time difference; and means for determining the algebraic difference between said first and second levels.

* * * * *

UNITED STATES PATENT AND TRADEMARK OFFICE
CERTIFICATE OF CORRECTION

PATENT NO. : 4,932,609

DATED : June 12, 1990

INVENTOR(S) : Lawrence N. Secchiaroli et al.

It is certified that error appears in the above-indentified patent and that said Letters Patent is hereby corrected as shown below:

In Column 1, line 4 change "The Government has rights in this invention pursuant to a contract awarded by the Department of the Navy."
to read—"This invention was made with Government support under N00019-85-C-0148 awarded by the Department of the Navy. The Government has certain rights in this invention."

Signed and Sealed this

Thirtieth Day of September, 1997

Attest:

BRUCE LEHMAN

Attesting Officer

Commissioner of Patents and Trademarks